United States Patent
Nir et al.

(10) Patent No.: US 6,750,814 B1
(45) Date of Patent: Jun. 15, 2004

(54) EFFICIENT ALGORITHM FOR PROCESSING GPS SIGNALS

(75) Inventors: Joseph Nir, Rehovot (IL); Baruch Shayevits, Rishon Lezion (IL); Hanoch Cohen, Rishon Lezion (IL); Eran Dochovni, Moshav Nir Zvi (IL)

(73) Assignee: CellGuide Ltd., Rehovot (IL)

( * ) Notice: Subject to any disclaimer, the term of this patent is extended or adjusted under 35 U.S.C. 154(b) by 0 days.

(21) Appl. No.: 10/363,777

(22) PCT Filed: Sep. 13, 2001

(86) PCT No.: PCT/IL01/00865

§ 371 (c)(1), (2), (4) Date: Jun. 16, 2003

(87) PCT Pub. No.: WO02/23213

PCT Pub. Date: Mar. 21, 2002

Related U.S. Application Data

(60) Provisional application No. 60/233,428, filed on Sep. 18, 2000.

(51) Int. Cl.$^7$ ............................................. H04B 7/185
(52) U.S. Cl. ........................... 342/357.12; 342/357.06; 701/213
(58) Field of Search ..................... 342/357.01, 357.05, 342/357.06, 357.12, 352; 701/213, 215, 207

(56) References Cited

U.S. PATENT DOCUMENTS

| | | | |
|---|---|---|---|
| 4,578,678 A | 3/1986 | Hurd | |
| 4,998,111 A | 3/1991 | Ma et al. | |
| 5,365,450 A | 11/1994 | Schuchman et al. | |
| 5,663,734 A | 9/1997 | Krasner | |
| 5,781,156 A | 7/1998 | Krasner | |
| 5,841,396 A | 11/1998 | Krasner | |
| 5,945,944 A | 8/1999 | Krasner | |
| 6,285,316 B1 * | 9/2001 | Nir et al. | 342/357.09 |
| 6,353,406 B1 * | 3/2002 | Lanzl et al. | 342/118 |

FOREIGN PATENT DOCUMENTS

| | | | |
|---|---|---|---|
| WO | WO98/25157 | 6/1998 | |
| WO | WO01/76285 | 10/2001 | ............ H04Q/7/20 |

OTHER PUBLICATIONS

U.S. patent application Ser. No. 09/727,752, Nir, filed Dec. 2000.

* cited by examiner

*Primary Examiner*—Dao Phan
(74) *Attorney, Agent, or Firm*—Mark M. Friedman

(57) ABSTRACT

A disclosed algorithm enables fast and efficient location of a mobile unit by obtaining and processing a snapshot of signals from all satellites in view of a constellation such as the Global Positioning System. The method is capable of dealing with weak signals and requires minimal use of processing time and use of communications resources. Each satellite transmits a signal that consists of a series of frames of a pseudo-noise sequence whereupon is superimposed a satellite data message. The total signal received from the satellite network by the mobile unit is arranged as columns of a matrix and is processed coherently to provide estimated pseudo-ranges and estimated rates of change of pseudo-ranges for in-view satellites. The coherent processing includes performing an initial orthogonal transform on the rows of the matrix and, uses prior knowledge to select that portion of the matrix containing a particular satellite signal for further processing. A reference vector, containing the respective pseudo-noise sequence, is prepared for each satellite in view by cyclically transposing the elements thereof to match the phase of the same sequence in the received signal from the satellite and multiplying the elements of the vector by Doppler compensation factors. Then, for each satellite in view, the columns of the selected matrix portion are convolved with the prepared reference vector for that satellite. Prior knowledge is again used to refine the selection and the satellite data message is demodulated to enable precise location of the start of a pseudo-noise sequence frame and the Doppler shift of the received signal. The process is repeated for at east four satellites in view to determine location and velocity of the receiving station by methods well known in the art.

37 Claims, 2 Drawing Sheets

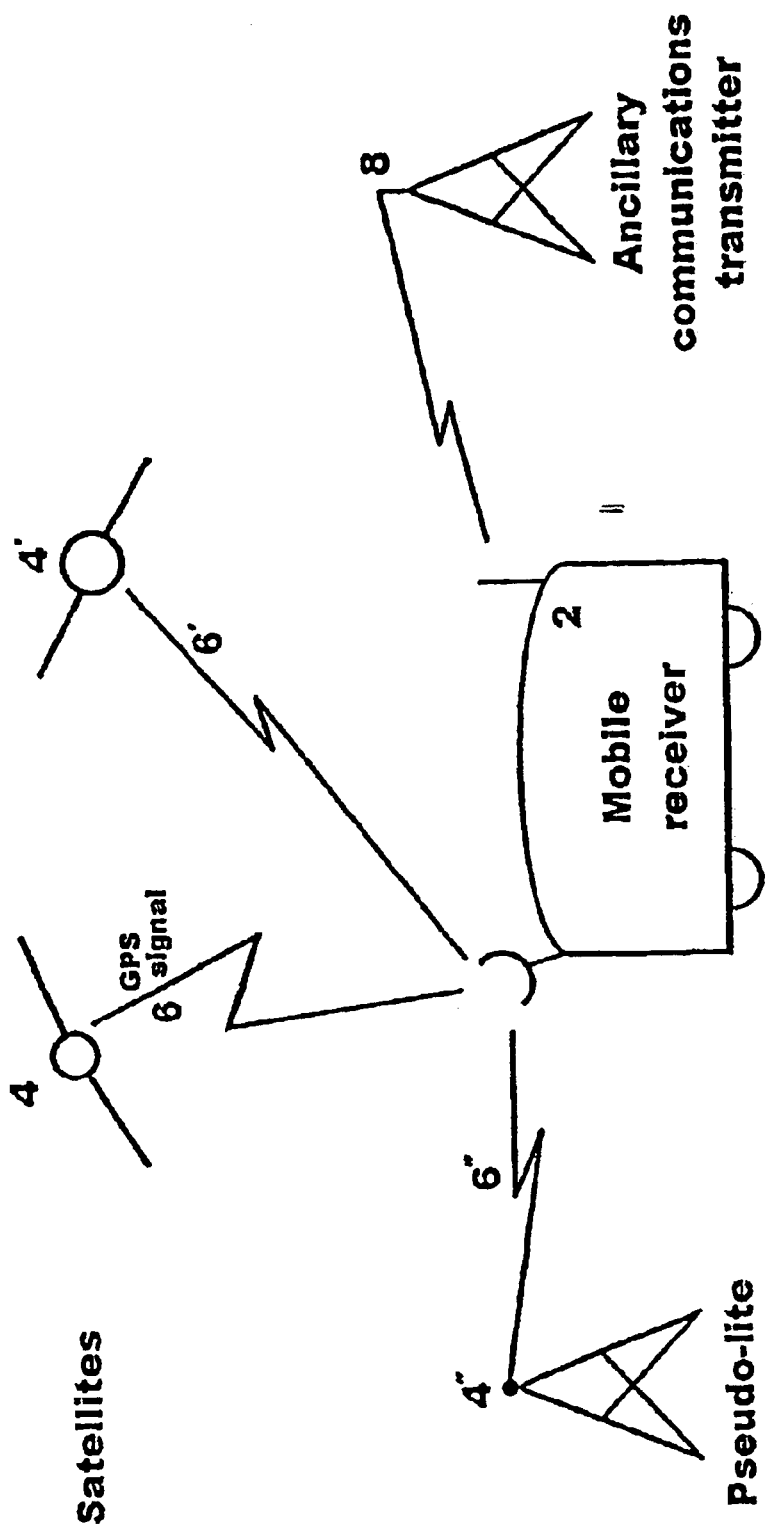

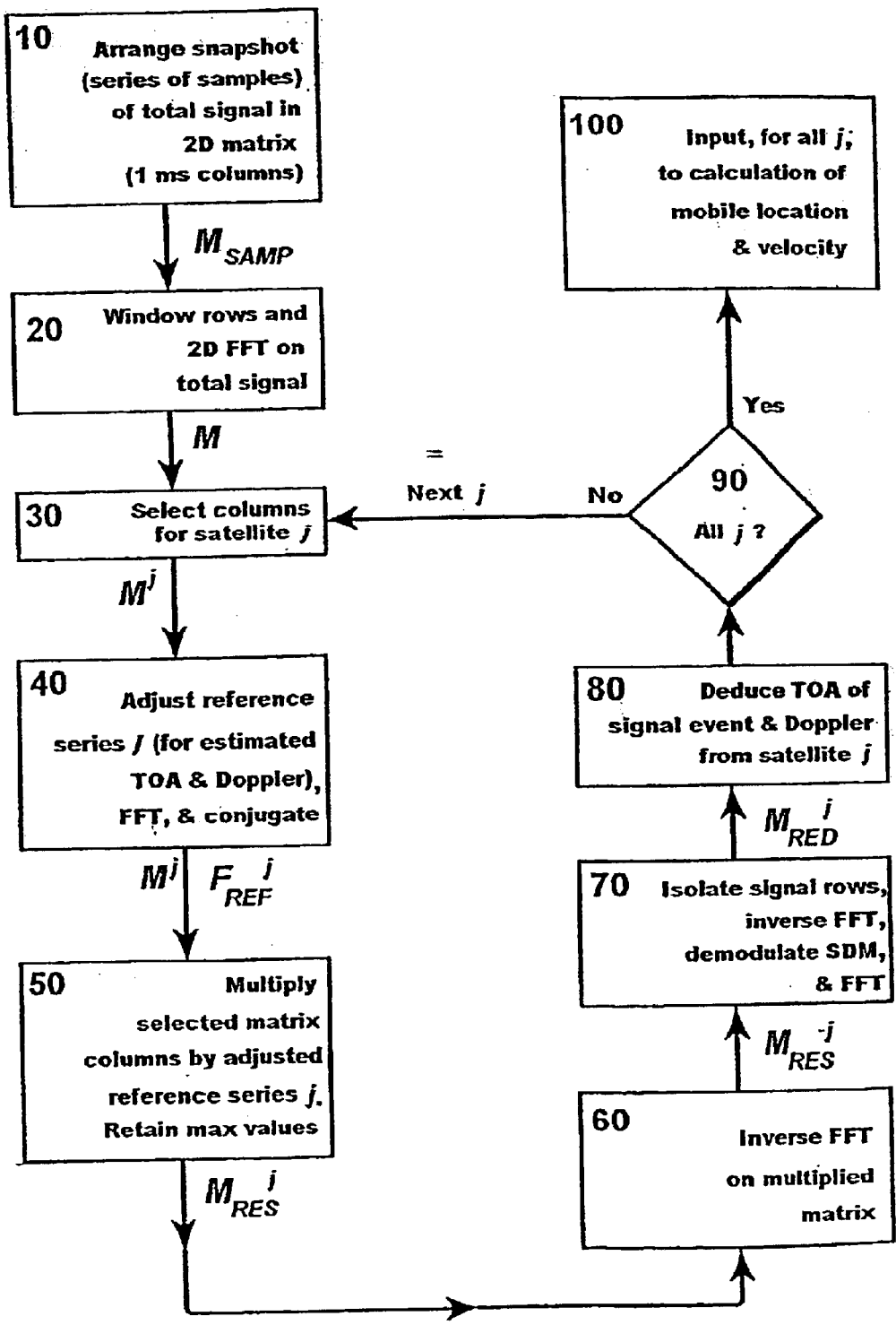
Figure 2 — Flow-chart of algorithm

EFFICIENT ALGORITHM FOR PROCESSING GPS SIGNALS

This application is the U.S. national phase of internal application PCT/IL01/00865 filed Sep. 13, 2001, which claims benefit to U.S. Provisional Application Serial No. 60/233,428 filed Sep. 18, 2000.

FIELD AND BACKGROUND OF THE INVENTION

The present invention relates to the fast processing of electronic signals and, more particularly, to the fast processing of signals in a positioning system based on a satellite network such as the Global Positioning System (GPS).

The Global Positioning System is a constellation of Earth-orbiting satellites that transmit standard signals that can be used to establish the location and velocity of a user equipped with a suitable GPS receiver. For civilian applications, the basic signals are "C/A codes" or Gold Codes, pseudo-random noise (PN) sequences, transmitted as repeated frames of 1023 chips at a chip rate of 1023 chips/ms (=one frame per millisecond). Each satellite is assigned a unique PN sequence, the PN sequences of the various satellites being mutually orthogonal.

Superimposed on the PN sequence of each GPS satellite is a continuously repeating Satellite Data Message (SDM), of 30 seconds duration, transmitted at a rate of 50 bits per second. The complete SDM is therefore 1500 bits long. Each bit (+1 or −1) of the SDM is modulated onto the satellite's signal by multiplying 20 consecutive frames of the PN sequence by that bit. The first 900 bits of the SDM include the satellite ephemeris and time model for the respective satellite. The remaining 600 bits of the SDM include a portion of the GPS almanac, which is a 15,000 bit block of coarse ephemeris and time model data for the entire GPS system. In addition, bits 1–8, bits 301–308, bits 601–608, bits 901–908 and bits 1201–1208 of every SDM are identical 8-bit (160 millisecond) headers that are invariant in time and that are identical in all the GPS satellites. Bits 31–60, bits 331–360, bits 631–660, bits 931–960 and bits 1231–1260 of every SDM are 30-bit (600 millisecond) hand-over words that are time-variant (these hand-over words include representations of the time of the week), but are, like the headers, identical in all the GPS satellites.

A GPS mobile unit receives a signal as a function of time, t, of the form:

$$G(t) = \sum_j G_j(t)$$

where:

$$G_j(t) = K_j D_j(t-\tau_j) g_j(t-\tau_j) \exp[i\omega(t-\tau_j)],$$

is the signal received from satellite j, j being an index that denotes a single satellite of those that are visible; i is the square root of −1; $\tau_j$ is the true one-way propagation time of radio waves from satellite j to the mobile unit; $K_j$ is an amplitude factor that depends on the true range $R_j = c\tau_j$ to satellite j at time t, and on the GPS antenna-gain pattern; $D_j(t-\tau_j)$ is the SDM of satellite j at time $(t-\tau_j)$; $g_j(t-\tau_j)$ is the PN sequence of satellite j at time $(t-\tau_j)$; and $\exp[i\omega_j(t-\tau_j)]$ is a frequency factor whose Doppler shift depends on the radial component of the velocity of satellite j relative to the mobile unit, on the bias of the mobile unit's internal clock, and on other imperfections in the mobile unit.

Conventionally, a GPS receiver acquires and tracks the signals from at least four GPS satellites by correlating the received signal with the satellites' respective PN sequences and locking on to the correlation peaks. Once a satellite is acquired and tracked, the GPS receiver decodes the ephemeris and time model thereof, from the respective SDM. This is repeated for each required satellite: These models include sufficient ephemeris data to enable the GPS receiver to compute the satellites' positions. The correlation peaks obtained during the continued tracking of the satellites provide measured times of arrival of these PN sequence frames. The differences between an arbitrary reference time and measured times of arrival, multiplied by the speed of light, are pseudo-ranges $\rho_j$ from the satellites to the GPS receiver. Typically, the reference time is the time at which the satellites commenced transmission of their respective PN sequences, as measured by the GPS receiver clock, which in general is offset from the GPS system clock by an unknown time offset. A pseudo-range, $\rho$, is related to the true range, R, of the respective satellite by $\rho = R + c_b$, where the range offset $c_b$ is the time offset, $T_0$, of the GPS receiver relative to GPS system time, multiplied by the speed of light c: $c_b = T_0 c$. From these pseudo-ranges, and from the known positions of the satellites as functions of time, the position of the GPS receiver is calculated by triangulation. Pseudo-ranges to at least four satellites are needed to solve at least four simultaneous equations of the form:

$$|\vec{s} - \vec{r}| = \rho - c_b$$

where $\vec{s}$ is the position vector of a satellite and $\vec{r} = (x,y,z)$ is the position vector of the GPS receiver, for the three unknown Cartesian coordinates x, y, z of the GPS receiver and for $c_b$. The satellites are sufficiently far from the GPS receiver that these equations can be linearized in x, y, and z with no loss of accuracy.

In similar fashion, measurement of the Doppler shifts of the received satellite signals enables calculation of the velocity of the GPS receiver. At least four simultaneous equations of the form:

$$(\vec{v}_s - \vec{v}) \cdot \hat{u}_{LOS} = v_r - c_d$$

where $\vec{v}_s$ is actual satellite velocity, $\vec{v}$ is velocity of the mobile unit, $\hat{u}_{LOS}$ is a unit vector denoting the line of sight to an observed GPS satellite, and $c_d$ is a clock drift correction. Relative speed with respect to a satellite is calculated from a measurement of the respective Doppler shift in the signal from that satellite.

A number of patents (e.g. U.S. Pat. No. 5,781,156) describe GPS receivers operating in a snapshot method. Such receivers record a sample of the signal from GPS satellites and process the recording later, off-line. This enables high reception sensitivity, as well as low consumption of battery power and small physical size. Signal processing must, however, be highly efficient in order to save processing time. Some of these receivers achieve a significant saving in processing time by transferring ancillary data for processing elsewhere through a communications network (cellular or other), in which case it is still important to reduce the amount of ancillary data sent, in order to save on communications resources.

Several prior art methods are known for increasing the efficiency with which a GPS receiver establishes its position and for reducing the power requirements of a GPS receiver. The SDM is 30 seconds long so, even under ideal reception conditions with parallel processing of the signals from all the satellites in view, it necessarily takes more than 30 seconds to get a GPS position fix. Prior knowledge of the SDM can reduce this time to less than 10 seconds. Schuchman et al., in U.S. Pat. No. 5,365,450, which is incorporated by reference for all purposes as if fully set forth herein, teach the transmitting of the SDMs to a GPS receiver integrated into a mobile unit, such as a cellular telephone or other wireless communications network receiver, by a base station of the network via the control channel of the network.

Krasner, in U.S. Pat. No. 5,663,734, which is incorporated by reference for all purposes as if fully set forth herein, teaches a GPS receiver for a mobile unit in which, as in the GPS receiver of Schuchman et al., the SDM is obtained via a wireless link to a base station, but then, instead of processing GPS signals in real time, the GPS receiver stores up to one second's worth of signals (1000 PN sequence frames per satellite), along with the initial time of arrival (TOA) of the signals, and processes the stored signals. Groups of 5 to 10 frames each are summed and correlated with the PN sequences of satellites expected to be in view, and the resulting correlation functions are added incoherently. Summation over up to 1000 frames boosts the signal-to-noise ratio correspondingly, and the post facto processing requires much less power than real-time processing.

Whatever system is used, there is thus a widely recognized need for, and it would be highly advantageous to have, a signal-processing algorithm that reduces calculation time and resource use. A particularly efficient algorithm is disclosed hereunder, which makes it possible to obtain very high sensitivity while making minimal use of processing time and communications resources.

SUMMARY OF THE INVENTION

According to the present invention there is provided a method for fast processing of electronic signals for determining a location of a mobile receiver including the steps of: (a) providing a satellite-based positioning system including a plurality of satellites, each satellite transmitting a signal including a plurality of blocks, each block including a plurality of frames of a known pseudo-noise sequence unique to each satellite, each block being multiplied by a bit of a data sequence, the signal being frequency-shifted relative to a nominal frequency; (b) receiving, by the mobile receiver, a snapshot of the signals of all the satellites in view and arranging the snapshot in a two dimensional matrix; and (c) mathematically windowing and transforming the matrix.

Preferably, the method of the invention further includes, for each satellite in view, the steps of: (i) selecting a portion of the mathematically windowed and transformed matrix containing a preponderance of the signal of each satellite according to the expected Doppler shift of the signal, that portion being a matrix having as many rows and, at most, as many columns as the mathematically windowed and transformed matrix; (ii) preparing a reference vector corresponding to each satellite, the vector being a mathematically transformed copy of a frame of the known pseudo-noise sequence of each satellite and having a number of elements equal to a number of elements of the number of rows of the mathematically windowed and transformed matrix; (iii) multiplying respective elements of each column of the selected portion of the mathematically windowed and transformed matrix by respective elements of the reference vector, thereby producing an adjusted matrix; and (iv) performing an inverse discrete orthogonal transform on each row of the adjusted matrix.

Preferably, the method of the present invention includes the further steps of (v) isolating a desired signal event by demodulating the data sequence of each satellite, and (vi) deducing a time of arrival of that signal event and the Doppler shift of that signal from each satellite.

The method of the invention preferably requires at least four satellites to be in view.

Preferably, a subsequent step of the method of the invention includes providing the deduced times of arrival and Doppler shifts for all satellites in view for calculation of the location and velocity of the mobile receiver.

Preferably, the invention provides for the inclusion of an ancillary communications network transmitting a synchronization signal at a respective transmission frequency receivable by the mobile receiver.

According to the present invention, arranging the snapshot in a two-dimensional matrix preferably includes the steps of: (i) digitizing the snapshot, to produce a digitized signal including a plurality of digitized elements; and (ii) arranging the digitized elements consecutively by column in a two-dimensional matrix, each column containing a sub-plurality of elements and corresponding to an integral number of frames of the pseudo-noise sequence.

In a preferred embodiment of the present invention, the number of the sub-plurality of elements is a power of two.

In a preferred embodiment of the present invention, the integral number of frames is one.

In a preferred embodiment of the present invention, the elements are complex numbers whose components most preferably are stored either as two-bit numbers or as one-bit numbers.

According to the present invention, mathematically windowing and transforming the matrix into the frequency domain preferably includes the steps of (i) applying a window function to each row of the matrix, (ii) performing a two-dimensional discrete orthogonal transform on the matrix, and (iii) overwriting the original matrix with the transformed matrix. Most preferably, the window function is a Hamming window and the orthogonal transform is a Fourier transform.

According to the present invention, the method of selecting the portion of the mathematically transformed matrix containing a preponderance of the signal of the each satellite preferably is based on: (i) information related to the data sequence including the satellite transmission schedule and the trajectory parameters of each satellite, and (ii) the approximate location of the mobile receiver.

In a preferred embodiment of the present invention, the data sequence is obtained from a transmission by the corresponding satellite.

In a preferred embodiment of the present invention, the trajectory parameters are stored in and retrieved from a data bank, which may be located either with the mobile receiver or at an area server. In the latter case, the data bank is retrieved on demand via the ancilliary communications network.

Preferably, according to the present invention, the mathematical transformation of a frame of the pseudo-noise sequence includes the steps of: (A) mathematically resampling the frame to consist of a number of elements equal to the number of the sub-plurality of elements in a column of the adjusted matrix; (B) cyclically shifting the elements of the resampled frame to be in phase with the pseudo-noise sequence received from each satellite, in accordance with an estimate of the expected time of arrival of the pseudo-noise sequence and the drift of the local clock in the mobile receiver; (C) multiplying each element of the cyclically shifted frame by a respective Doppler compensation factor; (D) transforming the Doppler-compensated frame by means of a discrete orthogonal transform (most preferably a Fourier transform); and (E) replacing each element of the transformed frame by the complex conjugate thereof.

Preferably, the time of arrival is estimated from: (a) information related to the data sequence, including the satellite transmission schedule and trajectory parameters of each satellite, and (b) knowledge of the approximate location of the mobile receiver.

In one preferred embodiment of the present invention, the drift of the local clock is measured by (a) providing an ancillary communications network wherewith the mobile receiver communicates, the ancillary communications network transmitting a synchronization signal at a respective transmission frequency, and (b) calibrating the, local clock against the synchronization signal.

In another preferred embodiment of the present invention, the drift of the local clock is measured by: (a) providing an ancillary communications network wherewith the mobile receiver communicates, the ancillary communications network transmitting a synchronization signal at a respective transmission frequency, and (b) calibrating the local clock against the transmission frequency.

In yet another preferred embodiment of the present invention, the drift of the local clock is measured by comparison with the transmission frequency of each satellite.

In a preferred embodiment of the present invention, the Doppler compensation factors are based on the likely frequency shift of the signal of each satellite due to a Doppler effect arising from relative motion of the satellite with respect to the mobile receiver.

In a preferred embodiment of the present invention, the likely frequency shift is estimated from: (a) information related to the data sequence, including the satellite transmission schedule and trajectory parameters of each satellite, and (b) the approximate location and velocity of the mobile receiver.

Preferably; according to the present invention isolating the desired signal event includes the steps of: (i) selecting a contiguous sub-set of the rows of the inverse-transformed adjusted matrix, in accordance with an estimate of the likely presence therein of a preponderance of the signal event, thereby providing a reduced matrix having as many columns and, at most, as many rows as the inverse-transformed adjusted matrix; (ii) performing an inverse discrete orthogonal transform (most preferably an inverse Fourier transform) on each column of the reduced matrix; (iii) multiplying elements of columns of the inverted, reduced matrix by respective expected data-sequence bits; and (iv) performing a discrete orthogonal transform on each column of the multiplied, inverted, reduced matrix, resulting in a transformed, reduced matrix.

In a preferred embodiment of the present invention, the estimate of the likely presence therein of a preponderance of the signal event is derived from: (a) knowledge of the data sequence, (b) the satellite transmission schedule for the data sequence, (c) the trajectory parameters of each satellite; and (d) the approximate location of the mobile receiver.

Most preferably, the desired signal event is the start of a frame, of the pseudo-noise sequence.

According to one preferred embodiment of the present invention, the expected data-sequence bits are inferred from: (a) knowledge of the data sequence, (b) the satellite transmission schedule for the data sequence, (c) the trajectory parameters of each satellite, and (d) the approximate location of the mobile receiver.

According to another preferred embodiment of the present invention, the expected data sequence bits are hypothesized.

According to a preferred embodiment of the present invention, deducing the time of arrival of the signal event and the Doppler shift of the signal of each satellite is effected by steps including: (i) identifying at least one peak in the transformed, reduced matrix, each such peak having a row coordinate, a column coordinate, and an absolute magnitude, the row coordinate corresponding to a pseudo-range of each satellite and the column coordinate corresponding to the rate of change thereof and (ii) if a plurality of such peaks are identified, interpolating among the peaks to refine the identification of the row coordinate and the column coordinate.

Most preferably, the interpolation is effected by two-dimensional curve fitting or by one-dimensional curve-fitting in each of the row and column directions.

BRIEF DESCRIPTION OF THE DRAWINGS

The invention is herein described, by way of example only, with reference to the accompanying drawing, wherein:

FIG. 1 shows system elements and

FIG. 2 is a flow chart of the major stages of the algorithm.

DESCRIPTION OF THE PREFERRED EMBODIMENTS

The present invention is of a method for processing and identifying certain encoded sign and specific events therein, received at relatively low intensity, that can be used to process the signals from beacons in a positioning system.

Specifically, the present invention can be used to process the signals in a satellite-based GPS positioning system by, for example, a mobile receiver, and to identify a specific event within those signals. The elements of the system are illustrated in FIG. 1, which shows a mobile receiver 2 receiving signals 6 and 6' from satellites 4 and 4', which are two representatives of a larger system.

Such systems may include fixed, ground-based beacons, at known locations, that emulate the signal structure of the satellites to compensate for limited or no satellite visibility. An example is shown as 4" in FIG. 1. These so-called 'pseudolites' can be used as additional or replacement signal sources. References to satellites in the following may be taken also to include pseudolites.

Optionally provided is an ancillary communications network, normally primarily for some other communications purpose, such as a cellular communications network. This has known characteristics, such as transmission frequency, and synchronization parameters. This is represented in FIG. 1 by a transmitter, 8.

Although the present invention is described herein with reference to the GPS system, it will be appreciated that this description is purely illustrative, and that the scope of the present invention extends to the processing of any suitable types of signals. For example, the method should be applicable to any kind of satellite-ranging signal, such as the Russian GLONASS constellation.

The principles and operation of the present invention may be better understood with reference to the drawing and the accompanying description.

The algorithm described hereunder enables processing of a short sample (typically 0.5–1 s duration, or even less) of a relatively long GPS signal, received at relatively low intensity. The object is to identify the respective satellite signals and to measure the TOA of a specific event in each signal as well as the Doppler shift of the signal. Such an event might be the beginning of a 1 ms frame (1023 chip length) of the PN cycle. From that TOA, one may determine the pseudo-range of the satellite from the GPS receiver. During every PN cycle, the satellite transits information that is multiplied by a unique series of 1023 chips. In order to identify the TOA, the received satellite signal is correlated with a known reference PN series for each satellite, available to the local receiver, so as to identify and separate out the signals of the respective satellites in view, and the result integrated over a period of time. In the disclosed algorithm, this integration is done coherently, over the entire sampling duration, thus achieving the highest possible sensitivity. Coherent integration distinguishes the method from prior art, which integrates signals incoherently. Subsequent incoherent operations are not precluded in this method, if needed, such as adding relatively large coherent blocks incoherently, to improve S/N ratio.

Outline of the Algorithm

The algorithm of this invention is outlined in FIG. 2 and includes the fundamental steps (numbered as in FIG. 2):

10) Obtaining a digitized snapshot of the signal by sampling the total GPS signals from all satellites in view and arranging the complex sample elements in a two-dimensional matrix, each column thereof corresponding to 1 ms;

20) Windowing the rows thereof and performing a two-dimensional Fast Fourier Transform (FFT), jointly for all satellites;

30) Separating out a block of columns pertaining to a respective satellite, j;

40) Mathematically adjusting a locally stored reference signal of satellite j, to align to a TOA of the received respective signal and matching a Doppler shift thereof, and then performing a Fourier Transform on the reference;

50) Multiplying the separated block of columns of the snapshot by the respective adjusted reference signal;

60) Performing an inverse FFT;

70) Isolating contiguous rows containing the respective satellite signal, performing an inverse FFT, demodulating the respective SDM, and performing an FFT;

80) Identifying the respective TOA and Doppler shift, or several estimates thereof, 90) Repeating steps 30 to 80 for each satellite j in view; and 100) Presenting TOAs and Doppler shifts for each satellite for calculation of the location and the velocity of the mobile receiver.

These steps are discussed in detail below.

The prior art employs various algorithms for fast processing of GPS signals, generally based on fast convolution. The disclosed algorithm of the present invention uses essentially the same processes but is more efficient, since half of the first convolution operation, i.e. the 2D FFT of step 20, is performed jointly for all satellites in view, on G(t) instead of on each individual satellite signal, $G_j(t)$, which leads to a significant saving of time.

Moreover, the method employed in the disclosed algorithm keeps the memory requirement low, in comparison with prior art, since the original snap data matrix is overwritten by the matrix resulting after the 2D FFT. The overall effect is a 50% reduction in computational memory requirement.

Prerequisites of the Algorithm

The algorithm of this invention requires supplementary data, obtained separately as, or estimated from, ancillary information. This data includes:

a) The identity (SAT ID) of each of the satellites (each denoted by j in FIG. 2) in view in the section of the sky which is observed at the time of sampling:

This information may be obtained via a communications network to which the GPS receiver also belongs (represented by transmitter 8 in FIG. 1) or, alternatively, may be calculated by the mobile unit itself from the Almanac, provided that the mobile self-location and the time of week are known with at least a very rough degree of accuracy, within ±50 km and a few seconds respectively.

b) The expected Doppler shift of the signal received from each satellite, and c) The drift of the local clock at the mobile unit:

It is possible to obtain data (b) and (c) in ways similar to, those for obtaining the SAT ID. The precision required by the algorithm of this invention for (b) and (c) together is not high, within 125 Hz This results in an acceptably small loss of signal energy during processing. A greater uncertainty would result in greater signal energy loss, which could be countered by selecting more columns although this would require more computing time. Local clock drift may be measured using the aforesaid communications network by comparing local clock time with the known time between synchronization frames within that network or to the bit rate (WO 98/25157), or to the RF frequency of the communications signal (U.S. Pat. No. 5,841,396 and co-pending U.S. patent application Ser. No. 09/727, 752, all of which are incorporated by reference for all purposes as if fully set forth herein).

d) The expected information bits from each satellite at the time of sampling:

The signal transmitted by the satellites includes the SDM, transmitted at a rate of 50 bits/s. This information, including the parameters of the trajectories of all the satellites in the constellation and their clocks, is not essential but may be used to shorten the processing time. It is possible to transfer the expected sampling bits as ancillary information via the communications network or, alternatively, to perform the sampling at a time when the bits are known a priori, for example, at the moment when the satellites are transmitting the details of the time of commencement of a six-seconds sub-frame (the HOW or hand-over word), or other features of the SDM, that are pre-known, or even mixtures of these. Many bits of the SDM are constant for up to ~3 hours and may be stored in a data bank for use when necessary. Such a data bank may be located at the mobile unit or remotely, for example at an area server, to provide information as needed through an ancillary communications network.

e) The arrival time (to a precision of approximately 1 ms) of the leading edge of the first data bit of the SDM transmitted by each satellite relative to the start of sampling. In other words, the time relationship of the start of a snapshot with respect to the SDM bits.

This may be calculated, provided that the approximate location of the mobile receiver (within 50 km), and the time of start of sampling (within ~1 ms) are known. It is also possible to determine the time based on previous measurements, if the sample processing is performed as part of a sequence of measurements.

Two parameters are required for its determination:
  i) The range of each satellite relative to the location of the mobile unit:
    This may be obtained from the Almanac—the approximate location (within 50 km), and the approximate time (within ~1 ms).
  ii) Time of start of sampling according to GPS time (within ~1 ms):
    This may be obtained, for example, by resetting the local clock during strong satellite reception (co-pending PCT application U.S. Ser. No. 01/09591, which is incorporated by reference for all purposes as if fully set forth herein), by calibrating the local clock with a local cellular communications network time utilizing events in the communications channel thereof (U.S. Pat. No. 5,945,944, which is incorporated by reference for all purposes as if fully set forth herein), or by locking onto a GPS time data bit, such the HOW word.

It is important to note that, even if the timing is less accurate than stated above, the method maintains its integrity through 'graceful degradation' whereby an accuracy of ~2 ms result in a fall-off of ~1 dB and ~3 ms leads to a ~2 dB degradation.

f) The pseudo-random code sequence of each satellite, $PN_j$:
  This is invariant for all satellites and may be stored locally.

Application of the Algorithm

The following discussion assumes use of a Fast Fourier Transform, FFT. The FFT is a specific example of a more general class of discrete orthogonal transforms, including the Walsh-Hadamard transform, wavelet transforms, and the Hartley transform. Although the FFT is most likely to be used in practice, because fast algorithms have been devised for the Fourier transform, the ensuing description comprehends the possibility of using other transforms.

The following steps are numbered to correspond with FIG. 2.

10. Obtaining a Snapshot by Sampling the Total GPS Signal and Arranging the Snapshot in a Two-dimensional Matrix A snapshot of the total signal from all satellites in view, G(t), is collected by sampling over a period of $2^N$ ms (integer N, typically N=3 to 10). All samples are complex numbers, R+iQ, wherein R is a real component, Q is a quadrature component, and i=?−1. Collection of the snapshot may be performed at any sampling rate, but the subsequent FFT is simplified if the sampling rate is $2^K$ kilo-samples/s (integer K). To meet the Nyquist theorem criterion, the minimum rate is 1024 kilo-samples/s (K=10); this rate is assumed in the following description because it reduces the amount of calculation, although K=11 (2048 kilo-samples/s) may be preferable in some circumstances. (In this context, 'kilo' means $2^{10}$=1024.)

The snapshot is then arranged in $2^N$-column matrix, $M_{SAMP}$, each of $2^K$ successive samples, each successive column corresponding to a successive 1 ms sampling duration. Each sample is a complex number.

Each sample consists of two components, R and Q, each of one or two bits. The signal is generally below thermal noise level so there is little point in saving eight bits per component. Throughout the various stages of processing, the disclosed invention keeps the components at the two-bit level thus minimizing memory usage, with negligible loss of sensitivity.

20. Performing a 2D FFT

Preparatory to performing a FFT, each row is multiplied by a Hamming, or other suitable window to produce a matrix $M'_{SAMP}$, in order to correct for the effects of sampling the signal for only a finite time.

A two-dimensional FFT is then performed on matrix $M'_{SAMP}$, (i.e. on the rows and on the columns thereof) resulting in a matrix M, of $2^K$ rows and $2^N$ columns.

The rows of M now correspond to a frequency span of 1 kHz because, in the time domain (before the FFT), each column had corresponded to 1 ms so that successive elements in a row of $M'_{SAMP}$ had been samples collected at 1 ms intervals, which is a 1 kHz sampling rate.

The row component of the 2D FFT has separated the signal, sampled at 1 kHz, into $2^N$ columns, each of $$\frac{1}{2^N} \text{ kHz}$$

bandwidth (e.g. ~1 Hz for N=10). Since the satellite signals are transmitted at fixed frequencies, the result for each particular satellite will be that the signal will be concentrated in one column of the transformed matrix, whereas thermal and other noise will be spread over all columns. In practice, because of uncertainty about the Doppler shift (typically ±1/16 kHz, equivalent to a spread of ~1/8 of a 1 kHz row span) and because of modulation of the signal by the SDM bits (which causes spectral diffusion equivalent to approximately the same frequency spread of 1/8 kHz (equivalent to ~1/8 of a row) the signal will extend over a contiguous block of about one-eighth of a row centered within a band extending over ~1/8 of a row span.

The columnar component of the 2D FFT serves a different purpose; it is, in fact, the first stage of a fast convolution to be performed in step 50, below. It is performed here only for convenience.

This 2D FFT step is performed once collectively, for all satellites in view, in contrast to prior art, wherein a process of correlation with the several satellite PN sequences is carried out first in order to separate out individual satellite signals. This brings a significant reduction in memory usage and gain in speed and efficiency over prior-art methods.

30 Selecting Columns Relating to Satellite j—once Per Satellite

A number of contiguous columns of M are now selected for further processing. The rationale for this is that the row FFT has concentrated signal energy mostly into these columns, while thermal noise, not being frequency-specific, is spread over all frequencies. By discarding the other columns, containing mainly noise and other extraneous signals, the desired-signal-to-noise ratio is thereby negligibly degraded. As described above, in step 20, the number of columns selected is a function of the precision to which frequency uncertainties are known; greater precision means fewer columns, and vice versa. For the reasons discussed earlier, about one-quarter of the columns of M are selected, resulting in a "j-matrix", $M^j$, having $2^K$ rows and $2^N/4$ columns.

For an expected Doppler shift $f_j$, the column number of the central of the selected columns will be (rounded to the nearest integer):

$$\text{Int}\left[\frac{(f_j \text{modulo} 1000) \times 2^N}{1000}\right],$$

because the FFT treats the incoming satellite signals as cyclic with a repetition rate of 1 ms, i.e. 1 kHz in frequency, and the transformation consequently "removes" any integer number of kiloHertz by cyclically folding each row at 1 kHz intervals.

The expected Doppler shift is derived from pre-knowledge of the orbital parameters of the satellites, which may be received directly from the satellites at any convenient time or be available in an area server to which the mobile unit also has access, and of the accuracy of the local clock.

Selecting only a portion (typically ¼) of the columns for further processing (a different portion for each satellite) results in a further efficiency gain. Although Doppler shift and modulation by the Satellite Data Signal actually causes the signal to be spread over the whole of each row of M containing the signal, in practice only an insignificant portion of the desired signal is outside the columns selected.

40. Aligning for TOA and Doppler Shifting the Reference Signal—Once Per Satellite A local copy of each satellite's reference series is corrected for arrival time of a respective satellite signal and for a Doppler shift thereof. As already discussed, the reference series is a pre-known Gold Code, PN series, unique to each satellite, a copy of which is available to the mobile receiver. Each frame of the series is comprised of 1023 chips repeatedly transmitted every millisecond. This series is mathematically "resampled" to $2^K$ elements (integer K≧10), to match the number of snapshot samples in a column of M or $M^j$.

The now-1024-element reference series is time shifted to align with the snapshot of the incoming satellite signal, to correct for the TOA thereof, which almost certainly will not coincide with the beginning of a PN frame of the reference series. External data about the approximate location of satellite j at the start of the snapshot and the TOA of a PN cycle start are applied for this purpose. Allowance for local clock drift is factored in at this stage. Alignment is done to within ±100 μs. This results in a 1×$2^K$ element "reference vector" the elements whereof having been cyclically shifted with respect to the elements of the PN frame in the reference series.

Clock drift is measured by comparison with a more reliable time source, such as ancillary communications network transmission frequency or synchronization signals of the ancillary communications network.

A Doppler correction is applied next by shifting the phase of each element. This is done by multiplying each element, n (n=0 to $2^K$−1), by a factor of the form, $$\exp\left(-\frac{2in\pi f_j}{2^K}\right),$$

where $f_j$ is the frequency shift in kHz of the signal from satellite j, incorporating a local clock drift and a Doppler shift due to relative satellite and receiver motions.

A FFT is then done on the time-shifted and Doppler-corrected 1024-element version of the reference series, which is then conjugated, resulting in a reference vector of 1×$2^K$ elements. This vector will be referred to as $F_{REF}^j$. To the accuracy of the estimated TOA and Doppler shift, $F_{REF}^j$ matches the signal arriving from the respective satellite. This step parallels the second half of the 2D FFT done on $M'_{SAMP}$ in step 20 above, in preparation for the fast convolution of step 50.

50. Multiplying by the Adjusted Reference Signal—Once Per Satellite

Each of the columns of signal samples matrix $M^j$ selected in step 20 of this disclosed algorithm is now multiplied by $F_{REF}^j$, element by element, resulting in a $$2^K \times \frac{2^N}{4}$$

matrix (in the example discussed) that will be referred to as $M_{RES}^j$.

The operation of which this step is part is the well-known correlation by fast convolution: perform a discrete Fourier transform on a column of a matrix, and multiply the transformed column by the conjugated discrete Fourier transform of the filter (in this case, the PN sequence). The final part, inverting by inverse discrete Fourier transform, follows.

60. Performing an Inverse FFT—Once Per Satellite

An inverse FFT is done on each column of $M_{RES}^j$, 60 in FIG. 2. The matrix so obtained will be referred to as $M_{RES}^{-j}$ and contains the required signal compressed into a few rows (ideally one row) after the correlation (or matched filtering) operation. The signal energy in this row (or rows) is spread over ~⅛ of $2^N$ consecutive elements (i.e. columns) of the row (or rows) because the SDM has not yet been compensated for.

The earlier discussion about the compression of the signal into several columns rather than a single column in the context of correcting for Doppler shift and clock drift is paralleled here, this time with respect to diffusion due to modulation by the Satellite Data Signal. Absent that modulation, the signal would now be expected to be found in only one column. Moreover, the signal would be in the fist row of $M_{RES}^{-j}$ except that uncertainty about the exact TOA might put the signal in the bottom row, or straddling bottom and top rows of consecutive columns, due to the top of a column's being the follow-on from the bottom of the previous column.

70. Demodulating SDM—Once Per Satellite

The effect of modulation by the information bits of the SDM (a diffusion of signal power over a broad frequency band) is now corrected by selecting a number of rows from $M_{RES}^{-j}$ wherein the required signal is expected to be, based on knowledge of the expected arrival time of a PN frame. Due to the shifting of the reference series in step 40, these rows will be located in the first rows of $M_{RES}^{-j}$ (or in the last rows, due to uncertainty in the TOA). The number of rows in this window depends on the uncertainty in the TOA:

$$\Delta_{TOA} \times 2^K$$

where $\Delta_{TOA}$ is TOA uncertainty and is typically ~20%, i.e. about ±100 μs in a column corresponding to 1 ms and $2^K$ is the number of rows in $M_{RES}^{-j}$. This results in a new, reduced matrix, $M_{RED}^{-j}$, typically having ~200 rows, in the case where K=10.

An inverse FFT is performed on each row of $M_{RED}^{-j}$ (which thereby reverts to the time domain) and the elements therein multiplied by expected SDM information bits to remove the effects of SDM modulation. If ~¾ of the columns be selected, this is the equivalent of a sample of the SDM every ~4 ms. This is because, having selected only a fraction of the matrix columns in the frequency domain, which nevertheless represent the same frequency range, the resultant matrix elements in the time domain represent a greater time interval than did the original matrix elements.

A FFT is then performed on only those row(s) where the signal is located (~20% of the rows) of $M_{RED}^{-j}$ to return to the frequency domain. The result is a matrix $M_{RED}^{j}$ wherein the signal is reduced to the vicinity of one point, an approximately ideal representation. This point will normally not coincide with a row or column. A curve-fitting technique is applied later (see below) to locate the point with greater precision than allowed by the coarse matrix row-column grid.

80. Locating Signal and Identify TOA—Once Per Satellite

Matrix $M_{RED}^{j}$ is examined to identify the element with a maximum value. The squared magnitudes of the (complex) elements of the final matrix represent the energy at each 'range, Doppler shift' pair, most being general background thermal noise, interference, and other extraneous signals.

One way to discriminate signals from this background noise is to use a constant false alarm rate detection scheme. Local thresholds are obeyed, matrix element by matrix element, by averaging the squared magnitudes of all the matrix elements in a window, (for example, an 8×8 window or a 16×16 window) but excluding a small central area where the target signal is expected to be. The set of matrix elements, whose squared magnitudes exceed their local average by a threshold factor, is in the form of isolated clusters of matrix elements, with each cluster corresponding to one peak. The threshold factor is determined by the required false alarm rate and probability of detection, as is well known in the art. Other methods for determining the threshold may also be used, as is well known in the art.

Since the maximum will be spread over a number of contiguous, matrix elements, the "coordinates" of the peaks, as understood herein, may be real numbers, not just integers. A polynomial curve in two independent variables may be fitted to these elements in order to determine a more precise location of the maximum somewhere between matrix elements, thereby achieving much greater accuracy than the coarse spacing of matrix elements, themselves. The accuracy obtainable is dependent on the signal-to-noise ratio which is typically at least ~10 dB. Instead of fitting a polynomial curve in two independent variables, two polynomials, each in one independent variable respectively in the row (corresponding to Doppler shift) and column (corresponding to range) directions, may be employed to reduce the calculation.

The output of this process is a 'folded' range and Doppler (i.e. respectively modulo the range of light in 1 ms, and 1 kHz) which are used calculate a full pseudorange and full Doppler of the mobile unit relative to each satellite j, wherefrom can be calculated the actual location and velocity of the mobile unit, by methods standard in the art.

90. Repeating for All Satellites in View

Steps 30 to 80 are repeated for at least four satellites in view. Since the SDM does not change very rapidly, the processes need not be simultaneous. Some leeway is possible in conducting measurements.

100. Providing Output for Triangulation

The results from the preceding steps are passed for further processing by methods well known in the art and as outlined in the Background section.

If there is no or insufficient information about the SDM, the steps 70 and 80 may be repeatedly carried out in accordance with a number of assumptions about the bits thereof, until the detection of a satellite signal or until all assumptions have been exhausted. Such a method is less than ideal since it involves a degree of guesswork and calculation until a match is obtained. This will normally be considerably less efficient than the disclosed method, but may work in the absence of an alternative.

While the invention has been described with respect to a limited number of embodiments, it will be appreciated that many variations, modifications and other applications of the invention may be made.

What is claimed:

1. A method for fast processing of electronic signals for determining a location of a mobile receiver comprising the steps of:
    a) Providing a satellite-based positioning system including a plurality of satellites, each satellite transmitting a signal including a plurality of blocks, each block including a plurality of frames of a known pseudo-noise sequence unique to each satellite, each block being multiplied by a bit of a data sequence, the signal being frequency-shifted relative to a nominal frequency;
    b) Receiving, by the mobile receiver, a snapshot of said signals of all said satellites in view and arranging said snapshot in a two-dimensional matrix; and
    c) Mathematically windowing and transforming said matrix into a frequency domain.

2. The method of claim 1, further comprising, for each said satellite in view, the steps of:
    i) Selecting a portion of said mathematically windowed and transformed matrix containing a preponderance of said signal of said each satellite according to an expected Doppler shift of said signal, said portion being a matrix having as many rows as said mathematically windowed and transformed matrix and, at most, as many columns as said mathematically windowed and transformed matrix;
    ii) Preparing a reference vector corresponding to said each satellite, said vector being a mathematically transformed copy of a said frame of said known pseudo-noise sequence of said each satellite and having a number of elements equal to a number of elements of said number of rows of said mathematically windowed and transformed matrix;
    iii) Multiplying respective elements in each said column of said selected portion of said mathematically windowed and transformed matrix by respective said elements of said reference vector, thereby producing an adjusted matrix; and
    iv) Performing an inverse discrete orthogonal transform on each row of said adjusted matrix.

3. The method of claim 2, further comprising the steps of:
    v) Isolating a desired signal event by demodulating said data sequence of said each satellite; and
    vi) Deducing a time of arrival of said signal event and a Doppler shift of the signal of said each satellite.

4. The method of claim 2, wherein the number of said satellites in view is at least four.

5. The method of claim 3, comprising the further step of providing said deduced times of arrival and said Doppler shifts for all said satellites in view for calculation of a location and a velocity of said mobile receiver.

6. The method of claim 5, comprising the further step of providing an ancillary communications network wherewith the mobile receiver communicates, said ancillary communications network transmitting a synchronization signal at a respective transmission frequency.

7. The method of claim 1, wherein said arranging of said snapshot in a two-dimensional matrix includes the steps of:

i) digitizing said snapshot thereby producing a digitized signal including a plurality of digitized elements; and
ii) arranging said digitized elements consecutively by column in said two-dimensional matrix, each said column:
   A) containing a sub-plurality of elements; and
   B) corresponding to an integral number of frames of said pseudo-noise sequence.

8. The method of claim 7, wherein said sub-plurality of elements includes a number of said elements equal to a power of two.

9. The method of claim 7, wherein said integral number is one.

10. The method of claim 7, wherein said elements are complex numbers.

11. The method of claim 10, wherein components of said complex numbers are stored as two-bit numbers.

12. The method of claim 10, wherein components of said complex numbers are stored as one-bit number.

13. The method of claim 1, wherein said mathematical windowing and transformation includes the steps of:
   i) applying a window function to each row of said matrix;
   ii) performing a two-dimensional discrete orthogonal transform on said matrix; and
   iii) overwriting original said matrix by said transformed said matrix.

14. The method of claim 13, wherein said window function is a Hamming window.

15. The method of claim 13, wherein said orthogonal transform is a Fourier transform.

16. The method of claim 2, wherein said selecting of said portion of said mathematically transformed matrix containing a preponderance of said signal of said each satellite is based on:
   i) information related to said data sequence including:
      A) a satellite transmission schedule; and
      B) trajectory parameters of said each satellite; and
   ii) an approximate location of the mobile receiver.

17. The method of claim 16, wherein said data sequence is obtained from a transmission by a corresponding said each satellite.

18. The method of claim 16, wherein said trajectory parameters are stored in and retrieved from a data bank.

19. The method of claim 18, wherein said data bank is located with the mobile receiver.

20. The method of claim 18, wherein said data bank is located at an area server and said retrieval is on-demand therefrom via said ancillary communications network.

21. The method of claim 2, wherein said mathematical transformation of said frame of said pseudo-noise sequence includes the steps of:
   A) mathematically resampling said frame to consist of a number of elements equal to a number of said sub-plurality of elements in a said column of said adjusted matrix;
   B) cyclically shifting said elements of said resampled frame to be in phase with said pseudo-noise sequence received from said each satellite in accordance with:
      I) an estimate of an expected time of arrival of said pseudo-noise sequence; and
      II) a drift of a local clock in the mobile receiver;
   C) multiplying each said element of said cyclically shifted frame by a respective Doppler compensation factor;
   D) transforming said Doppler-compensated frame by means of a discrete orthogonal transform; and
   E) replacing each element of said transformed frame by a complex conjugate thereof.

22. The method of claim 21, wherein said time of arrival is estimated from:
   a) Information related to said data sequence including:
      i) a satellite transmission schedule; and
      ii) trajectory parameters of said each satellite; and
   b) Knowledge of an approximate location of the mobile receiver.

23. The method of claim 21, wherein said drift of said local clock is measured by the steps of:
   a) Providing an ancillary communications network wherewith the mobile receiver communicates, said ancillary communications network transmitting a synchronization signal at a respective transmission frequency, and
   b) Calibrating said local clock against said synchronization signal.

24. The method of claim 21, wherein said drift of said local clock is measured by the steps of:
   a) Providing an ancillary communications network wherewith the mobile receiver communicates, said ancillary communications network transmitting a synchronization signal at a respective transmission frequency, and
   b) Calibrating said local clock against said transmission frequency.

25. The method of claim 21, wherein said drift of said local clock is measured by comparison with said transmission frequency of said each satellite.

26. The method of claim 21, wherein said Doppler compensation factors are based on a likely frequency shift of said signal of said each satellite due to a Doppler effect arising from relative motion of said satellite with respect to the mobile receiver.

27. The method of claim 26, wherein said likely frequency shift is estimated from:
   a) Information related to said data sequence including:
      i) a satellite transmission schedule; and
      ii) trajectory parameters of said each satellite; and
   b) An approximate location and velocity of the mobile receiver.

28. The method of claim 21, wherein said orthogonal transform is a Fourier transform.

29. The method of claim 3, wherein said isolating of said desired signal event includes the steps of:
   i) selecting a contiguous sub-set of said rows of said inverse-transformed adjusted matrix in accordance with an estimate of a likely presence therein of a preponderance of said signal event, thereby providing a reduced matrix having, at most, as many rows as said inverse-transformed adjusted matrix and as many columns as said inverse-transformed adjusted matrix;
   ii) performing an inverse discrete orthogonal transform on each column of said reduced matrix;
   iii) multiplying elements of columns of said inverted, reduced matrix by respective expected said data sequence bits; and
   iv) performing a discrete orthogonal transform on each column of said multiplied, inverted, reduced matrix, resulting in a transformed, reduced matrix.

30. The method of claim 29, wherein said estimate is derived from:
   a) Knowledge of said data sequence;
   b) A satellite transmission schedule for said data sequence;

c) Trajectory parameters of said each satellite; and d) An approximate location of the mobile receiver.

31. The method of claim 29, wherein said signal event is a start of a said frame of a said pseudo-noise sequence.

32. The method of claim 29, wherein said expected data sequence bits are inferred from:

a) Knowledge of said data sequence;

b) A satellite transmission schedule for said data sequence;

c) Trajectory parameters of said each satellite; and d) An approximate location of the mobile receiver.

33. The method of claim 29, wherein said expected data sequence bits are hypothesized.

34. The method of claim 29, wherein said orthogonal transform is a Fourier transform.

35. The method of claim 3, wherein said deducing of said time of arrival of said signal event and said Doppler shift of said signal of said each satellite is effected by steps including:

i) identifying at least one peak in said transformed, reduced matrix, each said at least one peak having a row coordinate and a column coordinate and an absolute magnitude, said row coordinate of said local maximum corresponding to a pseudo-range of said each satellite and said column coordinate of said local maximum corresponding to the rate of change thereof; and ii) if a plurality of said peaks are identified, interpolating among said peaks to refine said identification of said row coordinate and said column coordinate of said local maximum.

36. The method of claim 35, wherein said interpolation is effected by two-dimensional curve fitting.

37. The method of claim 35, wherein said interpolation is effected by one-dimensional curve-fitting in each of a row and a column direction.

* * * * *